United States Patent
Corradino (10) Patent No.: US 10,251,122 B2
(45) Date of Patent: Apr. 2, 2019

(54) METHOD FOR SWITCHING FROM A FIRST TO A SECOND MOBILE NETWORK OPERATOR AND CORRESPONDING DEVICE

(71) Applicant: GEMALTO SA, Meudon (FR)

(72) Inventor: David Corradino, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/536,236

(22) PCT Filed: Dec. 16, 2015

(86) PCT No.: PCT/EP2015/079965
§ 371 (c)(1),
(2) Date: Jun. 15, 2017

(87) PCT Pub. No.: WO2016/096966
PCT Pub. Date: Jun. 23, 2016

(65) Prior Publication Data
US 2018/0027486 A1    Jan. 25, 2018

(30) Foreign Application Priority Data

Dec. 17, 2014    (EP) .................................... 14307064

(51) Int. Cl.
*H04W 48/00* (2009.01)
*H04W 48/16* (2009.01)
(Continued)

(52) U.S. Cl.
CPC ............. *H04W 48/16* (2013.01); *H04W 8/18* (2013.01); *H04W 12/06* (2013.01); *H04W 48/17* (2013.01); *H04W 48/18* (2013.01)

(58) Field of Classification Search
CPC ..... H04W 12/06; H04W 48/16; H04W 48/17; H04W 48/18; H04W 8/06; H04W 8/18; H04W 40/244; H04W 88/06
See application file for complete search history.

(56) References Cited

U.S. PATENT DOCUMENTS

| | | | |
|---|---|---|---|
| 7,953,445 B2 * | 5/2011 | Brown ................. | H04W 8/245 455/557 |
| 2005/0079853 A1 * | 4/2005 | Hurtta ................. | H04W 48/18 455/403 |

(Continued)

FOREIGN PATENT DOCUMENTS

WO    WO 2012/164287 A1    12/2012

OTHER PUBLICATIONS

International Search Report (PCT/ISA/210) dated Mar. 14, 2016, by the European Patent Office as the International Searching Authority for International Application No. PCT/EP2015/079965.

(Continued)

*Primary Examiner* — Mohamed A Kamara
(74) *Attorney, Agent, or Firm* — Buchanan Ingersoll & Rooney PC (57) ABSTRACT

A device comprises a chip storing a first subscription relating to the first mobile network operator in a home country. The chip stores a second subscription relating to a second mobile network operator and associated with a preferred communication technology. The chip receives location information and analyses whether an extended cell identity value is present within the location information. The chip detects, based upon the analysis, a currently available communication technology relating to a second mobile network. The chip compares the currently available communication technology to at least one preferred communication technology. If the currently available communication technology matches at least one preferred communication technology, (Continued)

then the chip switches to a second subscription associated with the preferred communication technology. The chip sends to the device at least one identifier relating to the second subscription related to the second mobile network.

10 Claims, 1 Drawing Sheet

(51) Int. Cl.
  *H04W 8/18* (2009.01)
  *H04W 48/18* (2009.01)
  *H04W 12/06* (2009.01)

(56) References Cited

U.S. PATENT DOCUMENTS

| | | | |
|---|---|---|---|
| 2010/0015978 A1 | 1/2010 | Yoon et al. | |
| 2010/0216439 A1* | 8/2010 | Marcelli | H04M 15/00 455/414.1 |
| 2011/0069658 A1* | 3/2011 | Tiwari | H04W 48/16 370/328 |
| 2011/0098046 A1 | 4/2011 | Shin | |
| 2011/0294472 A1 | 12/2011 | Bramwell et al. | |
| 2014/0274006 A1* | 9/2014 | Mutya | H04W 36/14 455/416 |

OTHER PUBLICATIONS

Written Opinion (PCT/ISA/237) dated Mar. 14, 2016, by the European Patent Office as the International Searching Authority for International Application No. PCT/EP2015/079965.

Search Report dated May 6, 2015, by the European Patent Office for Application No. 14307064.7.

"3rd Generation Partnership Project; Technical Specification Group Core Network and Terminals; Universal Subscriber Identity Module (USIM) Application Toolkit (USAT) (Release 12)", 3rd Generation Partnership Project (3GPP), Sep. 2014, pp. 1-129, XP050926133.

* cited by examiner

METHOD FOR SWITCHING FROM A FIRST TO A SECOND MOBILE NETWORK OPERATOR AND CORRESPONDING DEVICE

FIELD OF THE INVENTION

The invention relates generally to a method for switching from a first to a second mobile network operator.

Moreover, the invention relates to a device for switching from a first to a second mobile network operator. The device comprises a chip.

The present invention is notably applicable to a mobile radio-communication field wherein a chip may be either embedded, such as an embedded Universal Integrated Circuit Card (or eUICC) within the device, as a chip host device, or removable from the device, as a chip included within a smart card termed Subscriber Identity Module (or SIM) type card or the like, as a Secure Element (or SE).

Within the present description, an SE is a smart object that includes a chip that protects access to stored data and is intended to communicate data with the outside world, like e.g. a mobile (tele)phone, as an SE host device.

STATE OF THE ART

When roaming, a mobile phone goes from a home to a neighbour (mobile communication) network cell that is located in a foreign country, the phone checks, within a file relating to Public Land Mobile Networks (or PLMNs) that are listed in a priority order, which network for the foreign country is the preferred network. Then, the phone selects, based on the PLMN file stored within an SE chip, and connects to the associated preferred network if this latter is available.

However, such a known solution uses an SE that forces the phone to use the communication technology that is associated with the preferred network as listed, independently of the available communication technology(ies).

Thus, there is a need to access, when a preferred communication technology is available, a corresponding mobile network.

SUMMARY OF THE INVENTION

The invention proposes a solution for satisfying the just hereinabove specified need by providing a method for switching from a first to a second mobile network operator.

According to the invention, a device comprises a chip. The chip stores a first subscription relating to the first mobile network operator. The first subscription is related to a home country. The chip stores at least one second subscription relating, each, to a second mobile network operator. Each of the at least one second subscription relates to the home country or a foreign country. Each of the at least one second subscription is associated with a preferred communication technology. The method comprises the following steps. The chip detects a currently available communication technology relating to a second mobile network, the second mobile network being related to a second home country operator or a foreign country operator. The chip compares the currently available communication technology to at least one preferred communication technology. If the currently available communication technology matches at least one preferred communication technology, then the chip switches to a second subscription associated with the preferred communication technology and relating to a corresponding second mobile network operator. And the chip sends to the device at least one identifier relating to the second subscription, the second subscription being related to the second mobile network.

The principle of the invention consists in that an SE using a first subscription discovers a communication technology that is available where the SE is present and constitutes a preferred communication technology, then forces an SE host device to swap (or switch) to a corresponding second subscription.

It is to be noted that the preferred communication technology may be comprised within an ordered priority list of one or several preferred communication technologies.

A device that interacts with the SE is thus forced to use a preferred communication technology that is associated with a second subscription instead of a communication technology associated with a first subscription.

The invention solution allows addressing an accessible communication technology that is registered at the SE side as a preferred communication technology by switching to a second subscription.

The invention solution allows accessing a preferred communication technology and therefore an additional granularity level with respect to the aforementioned prior art solution.

It is noteworthy that the preferred communication technology may be notably a second (or 2G), a third (or 3G) or a fourth (or 4G) generation (mobile radio) communication technology.

The preferred communication technology may allow accessing an enhanced Quality of Service (or QoS), an enhanced data debit rate, as a technical criterion(criteria) and/or any other non-technical criterion(criteria), as a criterion(criteria) that is(are) used for building an ordered list of one or several preferred communication technologies.

The invention solution allows benefiting, through a preferred communication technology, from an additional flexibility to access a corresponding mobile network.

It is to be noted that the second subscription which is active and used after the switch relates to either another home or a foreign country operator and is distinct from the first subscription which is used before the switch relating to the home country operator.

The invention method allows switching either statically, i.e. when present in a home or foreign country during a boot of the SE, or dynamically, i.e. when roaming, to a second subscription. The second subscription is accessible through a Mobile Network Operator (or MNO) or a Mobile Network Virtual Operator (or MVNO), as a second mobile network operator that has a roaming agreement with the home country operator, as a first mobile network operator.

The invention method is automatically implemented. Thus, a subscriber to a first mobile network, as user of the SE that implements the invention method, is not involved to switch to a second subscription relating to a second mobile network operator.

The invention method is therefore convenient for the subscriber to the concerned first home mobile network operator.

According to an additional aspect, the invention is a device for switching from a first to a second mobile network operator.

According to the invention, the device comprises a chip. The chip comprises means for storing a first subscription relating to the first mobile network operator. The first subscription is related to a home country. The chip comprises means for storing at least one second subscription relating, each, to a second mobile network operator. Each of the at least one second subscription is related to the home country or a foreign country. Each of the at least one second subscription is associated with a preferred communication technology. The chip is configured to detect a currently available communication technology relating to a second mobile network, the second mobile network being related to a second home country operator or a foreign country operator. The chip is configured to compare the currently available communication technology to at least one preferred communication technology. The chip is configured to switch to a second subscription associated with the preferred communication technology, if the currently available communication technology matches at least one preferred communication technology. And the chip is configured to send to the device at least one identifier relating to the second subscription, the second subscription being related to the second mobile network.

The chip may be fixed to or removable from the device.

The chip is preferably included within an SE.

The invention does not impose any constraint as to a kind of the SE type.

As a removable SE, it may be a SIM type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled or connected to a host device, as a device.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered a case in which the invention method for switching from a first to a second mobile network operator is implemented by a mobile phone, as a user terminal and a chip host device, and a chip carried by a card, as a chip medium and an SE.

The SE may nevertheless have different form factors, such as a dongle, like e.g. Universal Serial Bus (or USB) type dongle.

Instead of being a chip carried by a card, as a chip medium, the chip may be an embedded SE, as a chip soldered, possibly in a removable manner, on a Printed Circuit Board (or PCB) of a terminal, as a chip host computer device.

Naturally, the herein below described embodiment is only for exemplifying purposes and is not considered to reduce the scope of the present invention.

Figure 1:
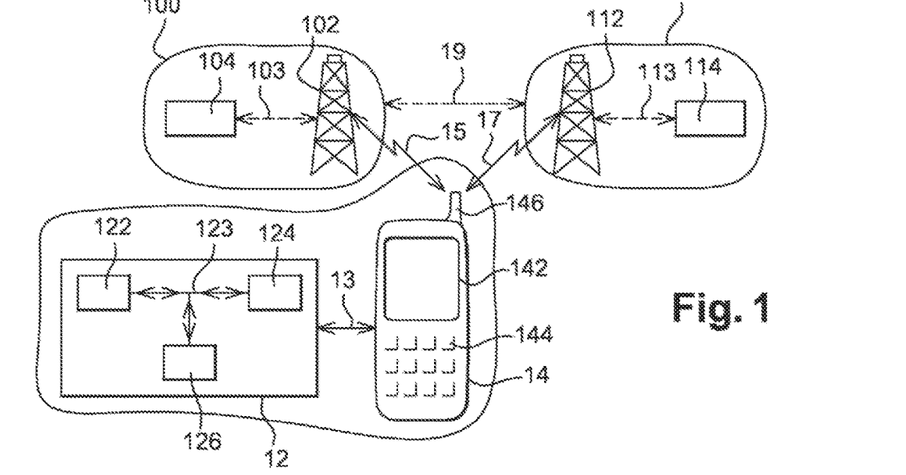
FIG. 1 is a simplified diagram of a first and a second mobile network and one exemplary embodiment of a terminal equipment, the terminal equipment being internally arranged to switch from a first subscription relating to a first mobile network operator to a second subscription associated with a currently detected communication technology, as a registered preferred communication technology relating to a second mobile network operator, according to the invention.

FIG. 1 shows schematically a terminal equipment 10 that is currently connected to a first mobile network 100 by using a first subscription and that is under radio coverage of a second mobile network 110.

The terminal equipment 10, as a device for switching from a first to a second mobile network operator, comprises a chip 12 and a mobile phone 14, as a user terminal.

The user terminal (or a machine in a Machine to Machine (or M2M) context or a terminal) may be either fixed (i.e. not mobile) or mobile. The (user) terminal may be a Personal Digital Assistant (or PDA), a vehicle, a set-top box, a tablet computer, a desktop computer, a laptop computer, a video player, an audio player, a portable TeleVision (or TV), a media-player, a game console, a netbook and/or any kind of electronic device that is able to exchange data by using different subscriptions and corresponding (radio-)communication technologies for accessing two or more mobile networks.

For clarity reason, the mobile phone 14, the first mobile network 100 and the second mobile network 110 are termed infra the phone 14, the first network 100 and the second network 110 respectively.

Instead of a phone, the user terminal or the terminal may be any other device including means for processing data, comprising or being connected to wireless communication means for exchanging data with outside, and comprising or being connected to means for storing data.

Within the present description, the adjective "wireless" used within the expression "wireless communication means" denotes notably that the communication means communicates via one or several Long Range (or LR) Radio-Frequency (or RF) links.

The LR RF may be fixed at several hundreds of MHz, for instance, around 850, 900, 1800, 1900 and/or 2100 MHz.

The phone 14 is preferably used for accessing two (or more) mobile radio-communication networks, namely at least the first 100 and the second 110 network.

The mobile radio-communication networks, as cellular communication networks, may be constituted by a Global System for Mobile Communications (or GSM), a General Packet Radio Service (or GPRS), a Universal Mobile Telecommunications System (or UMTS), an EDGE (acronym for "Enhanced Data Rates for GSM Evolution"), a Code Division Multiple Access (or CDMA), and/or a Long Term Evolution (or LTE) type network(s).

Such cellular communication network set is not exhaustive but only for exemplifying purposes.

The first network 100 uses a first communication technology, so as to exchange with an RF enabled device, like e.g. the phone 14.

The first network 100 may be related to a home country and possibly one or several foreign countries.

The first network 100 includes a first base station 102 (or the like) that is used for communicating, over a first RF link 15, with an RF enabled device, like e.g. the phone 14.

The first network 100 is operated by at least one first (mobile network) operator, like e.g. a Mobile Network Operator (or MNO) and/or a Mobile Virtual Network Operator(s) (or MVNO), as an MNO1.

The first network 100 covers, through the first base station 102, at least in part a geographical area in which the phone 14 is situated.

The first network 100 includes a first network authentication server, as a first (remote) server 104.

The first server 104 is connected indirectly through internal network links 103 to the first base station 102.

The second network 110 is distinct from the first network 100.

The second network 110 uses a second communication technology, so as to exchange with an RF enabled device, like e.g. the phone 14. The second communication technology may be identical or distinct from the first communication technology.

The second network 110 may be related to the home country or one or several second foreign countries. Among the second foreign countries, there are one or several first foreign countries that are in common with the first network 100.

Thus, the second network 110 may be related to either the home country or a foreign country.

The second network 110 includes a second base station 112 (or the like) that is used for communicating, over a second RF link 17, with an RF enabled device, like e.g. the phone 14.

The second network 110 covers, through the second base station 112, at least in part a geographical area in which the phone 14 is situated.

The second network 110 includes a second network authentication server, as a second (remote) server 114.

The second server 114 is connected indirectly through internal network links 113 to the second base station 112.

The second network 110 may be connected, through a bi-directional wired link 19, to the first network 100.

The second network 110 is operated by at least one second (mobile network) operator, like e.g. an MNO and/or an MVNO(s), as an MNO2.

The second operator may be the first operator or distinct from the first operator.

When there are two different operators, they should have signed an agreement. It allows a subscriber to the first operator to access, over a detected communication technology, the second network 110 relating to the second operator MNO2. To access the second network 110, the chip 12 imposes to select a corresponding second subscription when present in a covered place where the subscriber RF enabled device desires to use a corresponding preferred second communication technology.

Thus, a terminal subscriber to the first operator MNO1 is able to communicate data by using a preferred communication technology that is available and associated with a second subscription relating to the second network 110 operated by the second operator MNO2. The agreement may be mutual. Thus, it allows a terminal subscriber to the second operator MNO2 to benefit from an access, over a corresponding preferred communication technology, to the first network 100. To access the first network 100, the chip 12 imposes to select a corresponding first subscription when present in a covered place where the subscriber RF enabled device desires to use a corresponding preferred first communication technology.

The phone 14 includes preferably a display screen 142 and a keyboard 144, as Man Machine Interface (or MMI).

Alternatively, instead of a physical keyboard separated from the display screen, the phone 14 is equipped with a touch sensitive display screen, as virtual keyboard.

The MMI allows a phone user to interact with the phone 14.

The phone 14 comprises an antenna 146. The antenna 146 allows communicating data, through LR RF links 15 and 17, with two (or more) mobile radio-communication networks 100 and 110.

The phone 14 includes data processing means, such as one microprocessor (not represented), data storing means (not represented), as phone memory, and one or several Input/Output (or I/O) interfaces that are linked all together through a control and data bus (not represented).

The phone 14 plays, in a preferential manner, a role of a modulator-demodulator (or modem), so as to exchange data over an LR RF link.

The phone 14 carries out the following operations:

a modulation of an analogical carrier signal to encode digital information to be transmitted, over the antenna 146, to one (or several) network authentication server(s) 104 and/or 114 (and/or another entity (not represented)), and a demodulation of a received analogical carrier signal to decode the encoded digital information that is received, over the antenna 146, from a network authentication server(s) 104 and/or 114 (and/or another entity (not represented)).

The phone memory may comprise one or several memories including one or several volatile memories and one or several non-volatile memories.

A phone memory, be it either volatile or non volatile, stores, at least in a temporary manner, data relating to a subscription, namely the first subscription and, after a switch as further explained, the second subscription, which the phone 14 receives from the chip 12.

The phone 14 may include, as volatile memory, a cache memory.

The phone memory stores an Operating System (or OS) and one or several applications.

The phone 14, as a chip host device, is coupled or connected to the chip 12, as a chip removable from the phone 14.

Alternately, the phone 14 comprises the chip 12 that is soldered, i.e. fixed, possibly in a removable manner, to the PCB of the phone 14.

The phone I/O interfaces include one or several I/O interfaces for exchanging data with the chip 12.

The phone I/O interface with the chip 12 may be an International Organization for Standardization (or ISO) 7816 interface, as a contact interface, when the chip 12 is inserted, in a removable manner, within the phone 14.

Alternately, instead of a contact interface, the phone I/O interface with the chip 12 is connected to or includes a contact-less interface. The phone 14 is connected to or includes means for communicating data while using preferably a Short Range (or SR) RF link. The SR RF link may be related to any technology that allows the phone 14 to exchange data, through a so-termed contact-less link with the chip 12. The SR RF may be fixed at 13.56 MHz and related to a Near Field Communication (or NFC) type technology, as a contact-less technology.

The chip 12 is under control of the phone microprocessor.

The chip 12 is preferably associated with or tied to the first server 104, as a first network authentication server, that is included (or connected to) the first network 100.

The chip 12 belongs to a user, as a subscriber to a wireless service(s).

The chip 12 is connected, through a bi-directional link 13, to the phone 14.

The chip 12 includes a microprocessor(s) 122, as data processing means, a memory(ies) 124, as data storing means, and one or several I/O interfaces 126 that are internally all connected, through an internal bidirectional data bus 123, to each other.

The I/O interface(s) 126 allow(s) communicating data from the internal chip 12 components to the chip exterior and conversely.

The microprocessor 122 processes, controls and communicates internally data with all the other components incorporated within the chip 12 and, through the I/O interface(s) 126, with the chip exterior.

The microprocessor 122 executes or runs one or several applications.

The microprocessor 122 executes, in a preferred manner, one or several security functions.

The security functions include preferably a user authentication process to be used prior to continuing to access the memory 124, notably at a boot and/or a re-boot of the chip 12. To authenticate the user, the user has to provide a Personal Identity Number (or PIN) or biometric data, as user reference data, that is stored, preferably in a secure manner, within the memory 124. As biometric data, it may include one or several fingerprints, one or several iris prints, one or several voiceprints relating to one or several authorized users.

The microprocessor 122 is preferably able to initiate actions, in order to interact directly with the outside world, in an independent manner of the phone 14, as a chip host device. Such a capacity of interaction at the initiative of the chip 12 is also known as being a proactive capacity. According to one preferred embodiment, the chip 12 is able to use SIM ToolKit (or STK) type commands, as proactive commands.

The chip 12 is thus able to send, at its own initiative, through (to any device connected to the phone 14) or to the phone 14, a proactive command, like e.g. a "PROVIDE LOCI" command for getting location information relating to a location where the subscriber is currently situated or located.

The chip 12 is able to switch from the first subscription to a second subscription by de-activating the first subscription, as a currently active subscription, and activating the second subscription, as a currently non-active subscription to be activated.

The memory 124 stores preferably data relating to a Uniform Resource Identifier (or URI), a Uniform Resource Locator (or URL) and/or an Internet Protocol (or IP) address of an external entity to be addressed, like e.g. the first server 104 relating to the first network 100.

The memory 124 stores an OS.

The memory 124 stores preferably one or several Subscriber Identity Module (or SIM) type applications.

The SIM type application(s) includes, among others, a SIM application for a Global Service for Mobiles (or GSM) type network, a Universal Subscriber Identity Module (or USIM) application for a Universal Mobile Telecommunications System (or UMTS) type network, a Code Division Multiple Access (or CDMA) Subscriber Identity Module (or CSIM) application and/or an Internet protocol Multimedia Subsystem (or IMS) Subscriber Identity Module (or ISIM) application.

The SIM type application(s) allow(s) the phone 14 to identify and authenticate to the first and second networks 100 and 110.

The memory 124 stores preferably data relating to a Uniform Resource Identifier (or URI), a Uniform Resource Locator (or URL) and/or an Internet Protocol (or IP) address of an external entity(ies) to be addressed, like e.g. the first server 104 and/or the second server 114, as an interlocutor device(s).

The memory 124 stores preferably a plurality of sets of data relating, each, to a subscription, as a wireless service(s). Among the subscription data set plurality, there are a first subscription data set relating to the first network 100 and at least one second subscription data set relating to the second network 110.

The first subscription data set IMSI1 relates to the first operator MNO1.

The memory 124 stores data relating to a correspondence table that includes for a given country A, a set of communication technologies including e.g. one or several 2Gs, one or several 3Gs and one or several 4Gs and, for each communication technology, a corresponding subscription data set. The given country A may be the home country or a foreign country, as the country in which the concerned RF enabled device is present. Each subscription data set is identified by an identifier relating to a concerned subscription to be activated.

The correspondence table is previously provisioned. The correspondence table lists, in a priority order, the preferred communication technologies, among which one is to be selected, activated and used after a subscription switch.

The priority order may be determined in accordance with an enhanced QoS, an enhanced data debit rate, as a technical criterion(criteria) and/or any other non-technical criterion (criteria), as a criterion(criteria) that is(are) used for building the ordered list of one or several preferred communication technologies.

For instance, the correspondence table is as follows:

| Country | Available communication technology | Subscription (data set) to be activated |
|---------|-----------------------------------|----------------------------------------|
| A | 4G | IMSI2 |
| A | 3G | IMSI3 |
| A | 2G | IMSI1 |
| A | 2G | IMSI4 |

The memory 124 stores, in this example, four subscription data sets namely:

a first subscription data set, as "IMSI1", that is associated with the 2G communication technology that is of third greatest priority level;

a second subscription data set, as "IMSI2", that is associated with a 4G communication technology that is of greatest priority level;

a third subscription data set, as "IMSI3", that is associated with a 3G communication technology that is of second greatest priority level; and a fourth subscription data set, as "IMSI4", that is associated with a 2G communication technology that is of fourth greatest priority level.

Several subscription data sets relating to two (or more) corresponding mobile network operators and corresponding mobile networks 100 and 110 are available, at the client side, within the chip 12.

In the example, the second, third and fourth subscription data sets IMSI2, IMSI 3 and IMSI 4 relate, each, to the second operator MNO2 that is preferably distinct from the first operator MNO1.

The second operator MNO2 is a second home country operator or a foreign country operator.

For one and the same communication technology, several corresponding subscription data sets are present within such a preferred communication technology list. However, only the subscription data set that is of highest priority level with respect to one (or several) other subscription data set(s), is to be selected and then activated instead of a currently activated subscription data set.

In the example, for a 2G communication technology, the first subscription data set IMSI1 is of highest priority level with respect to the fourth subscription data set IMSI4.

Each set of data relating to one subscription to a mobile network operator includes:

an International Mobile Subscriber Identity (or IMSI), as a subscriber and a (service) subscription identifier for accessing a mobile network;

a key Ki, as a network authentication key, allowing to authenticate the concerned subscriber to the concerned mobile network;

Milenage, as a network authentication algorithm, allowing to authenticate the concerned subscriber to the concerned mobile network;

a file system including one or several Elementary Files (or EF);

one or several security keys, like e.g. a key(s) for encrypting/decrypting data and/or a key(s) for signing data a key(s), as secret data; and/or one or several credentials, like a user name and/or an IDentifier (or ID) of the subscriber, as data relating to the user.

The memory 124 stores, preferably within a security domain (not represented), as a first memory area, the first subscription data set.

The first subscription data set comprises an identifier IMSI1 relating to the first subscription.

The first subscription data set IMSI1 allows the phone 14 to identify and authenticate to the first server 104.

The first subscription data set IMSI1 is active, i.e. is in an enabled state, before a subscription switch and is inactive after the subscription switch at the chip 12 side.

The first subscription data set IMSI1 includes preferably a first key Ki1, as a first network authentication key Ki1, for authenticating the subscriber to the first mobile network 100. The first network authentication key Ki1 is associated with the first subscriber. The first network authentication key Ki1 allows authenticating the associated first subscriber to the first server 104.

The memory 124 also stores, preferably within another security domain (not represented), as a memory area that is distinct from the first memory area, each other subscription data set.

The second, third and fourth subscription data sets comprise, each, an identifier IMSI2, IMSI3 and IMSI4 relating to the second, third and fourth subscription respectively.

The second, third and fourth subscription data sets IMSI2, IMSI3 and IMSI4 allow, each, accessing from the phone 14 to the second network 110.

The second, third and fourth subscription data sets IMSI2, IMSI3 and IMSI4 allow, each, the phone 14 to identify and authenticate to the second network 110, namely either the second server 114 or, through the second network 110, to the first server 104.

The second, third and fourth subscription data sets IMSI2, IMSI3 and IMSI4 are inactive, i.e. are in a disabled state, before a subscription switch. Only one of the second and third subscription data sets IMSI2 and IMSI3 will be active after the subscription switch at the chip 12 and the phone 14, depending on which communication technology is detected by the chip 12 as being currently available, namely a 4G or a 3G.

The second, third and fourth subscription data sets IMSI2, IMSI3 and IMSI4 include preferably the first key Ki1 for authenticating the subscriber to the first network 100 or a second key Ki2 for authenticating the subscriber to the second network 110. The second network authentication key Ki2 is associated with the second subscriber. The second network authentication key Ki2 allows authenticating the associated second subscriber to the second server 114. Alternately, instead of the second server 114, as an authenticator of the second subscriber, the second network 110 may redirect a corresponding network authentication request to the first server 104 that shares the concerned network authentication key, namely the first Ki1 or the second Ki2 network authentication key with the chip 12.

Among the supported applications, the memory 124 stores an invention application termed subscription manager that the microprocessor 122 executes.

The subscription manager allows carrying out a subscription switch at the chip 12 side, so as to use data relating to the second subscription, as a subscription associated with a preferred communication technology, to be activated. The subscription manager allows ensuring to switch from a connection to the first network 100 to a connection to the second network 110 without involving preferably the terminal user.

According to an essential invention feature, the subscription manager is adapted to detect a currently available communication technology relating to a second network 110.

To detect an available communication technology, the subscription manager polls regularly, e.g. every 30 s, the phone 14 about current LOCation Information (or LOCI). The subscription manager analyses whether an extended cell identity value, as one particular data field that may be comprised within the LOCI to be retrieved from the phone 14, is or is not present within the considered current LOCI. Only if the extended cell identity value is absent within a received LOCI, then the detected communication technology is of the 2G type.

The memory 124 stores a predetermined first value relating to an extended cell identity value, as one particular data field comprised within LOCI to be retrieved from the phone 14 and to be equalized, so as to detect a 3G type communication technology, as a detected available communication technology.

The memory 124 stores a predetermined second value relating to an extended cell identity value, as one particular data field comprised within LOCI to be retrieved from the phone 14 and to be equalized, so as to detect a 3G type communication technology, as a detected available communication technology.

Figure 3A:
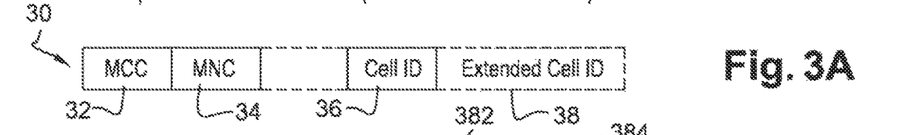
FIG. 3A represents data fields comprised within the LOCation Information (or LOCI), as location information relating to the location where the terminal equipment of FIG. 1 is currently situated, that the chip gets from the terminal to determine a currently available communication technology relating to the second mobile network.
Figures 3B, 3C:
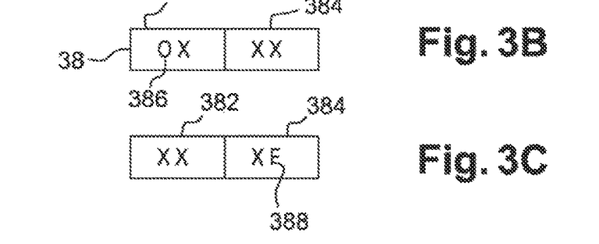
FIG. 3B is a predefined first value of an extended cell Identity (or ID), as a data field comprised within the FIG. 3A LOCI, to be detected when the currently detected communication technology is a 3G type communication technology.
FIG. 3C is a predefined second value of an extended cell Identity (or ID), as a data field comprised within the FIG. 3A LOCI, to be detected when the currently detected communication technology is a 4G type communication technology.

Such an available communication technology detection is further explained in relation with the FIGS. 3A to 3C.

According to another essential invention feature, the subscription manager is adapted to compare a currently (detected) available communication technology to one or several preferred communication technologies, as an ordered priority list.

If the currently (detected) available communication technology does not match any preferred communication technology that is present within the ordered priority list, then the subscription manager keeps the first subscription data set IMSI 1 active, i.e. does not carry out any subscription switch.

Otherwise, i.e. if the currently (detected) available communication technology does match one or several preferred communication technologies, the subscription manager selects a corresponding preferred communication technology with the highest priority level within the ordered priority list of the preferred communication technologies and switches to the subscription data set, as a second subscription, that is associated with the concerned selected and preferred communication technology.

More exactly, the subscription manager is adapted to de-activate the first subscription IMSI1 and to activate the concerned second subscription.

Once switched, the subscription manager is able to send to the phone 14 one (or several) identifier(s) relating to the concerned second subscription, so as to launch an attachment to the second network 110.

Once the phone 14 has received the second subscription identifier(s), the phone 14 sends to the corresponding second network 110 a request for authenticating to the second network 110. The network authentication request includes all or part of the second subscription identifiers.

Then, the chip 12 is able to identify and authenticate, based on the concerned stored second subscription data set, to the second network 110.

The chip 12 is able to receive, as request response, from the second server 114 a message relating to a result of a network authentication, namely either a success or a failure relating to the network authentication.

The second server 114 is identified by a URI, like an URL, an IP address and/or the like, as a server identifier(s).

The server identifier may be stored within the chip memory 124 or a phone memory.

The second server 114 may be operated by a second mobile (radio-communication) network operator MNO2, as a service provider or on its behalf.

The second server 114 is hosted by a computer.

The second server 114 is dedicated to running an application for managing a database and communicating data of the database to outside.

The second server 114 is used for authenticating the second subscription.

Alternately, another server (not represented) that is connected to the second server 114 manages the database.

The second server 114 includes preferably a memory (not represented) that stores the database.

Instead of an internal memory, the second server 114 is connected to an external memory (not represented) storing the database.

The database includes a set of one (or several) identifier(s) relating, each, to a second subscription and a corresponding network authentication key Ki.

Figure 2:
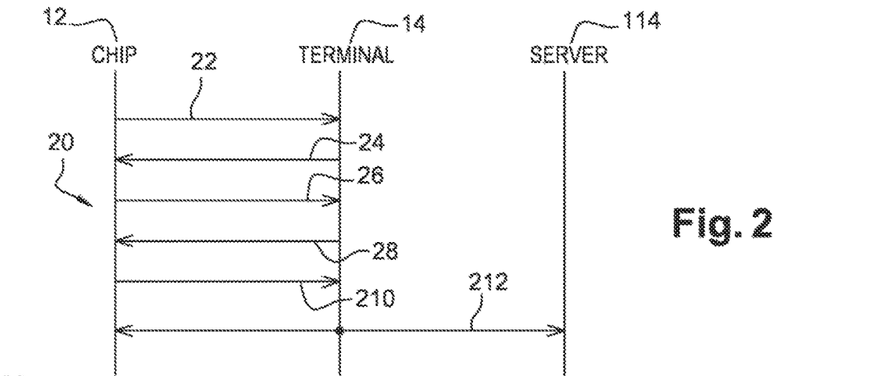
FIG. 2 illustrates an example of a flow of messages exchanged between an authentication server relating to the second mobile network and the different entities of the terminal equipment of FIG. 1, so that a chip hosted by the terminal forces, based on the registered preferred communication technology, the terminal to attach to a corresponding second network by using the second subscription.

FIG. 2 depicts an exemplary embodiment of a message flow 20 that involves the chip 12, the phone 14 and the second server 114.

In the explained example, it is assumed that the phone 14 is a 2G, 3G and 4G RF enabled and located in the country A under a radio coverage of the first 100 and the second 110 network.

It is also assumed that the chip 12 has authenticated to the first server 104 by using the first subscription identifier IMSI1 and the associated network authentication key Ki1 of the first subscription data set.

It is further assumed that only one subscription is active at a given time and that the first subscription IMSI1 is active, before a subscription switch, at the chip 12 and the phone 14.

The chip 12 sends preferably to the phone 14 a Provide LOCI type proactive command 22, as a STK type command, so as to request location information relating to a location where the phone 14 is currently situated. Such a LOCI allows the chip 12 to detect an available communication technology.

S Once the phone 14 has retrieved a current LOCI, the phone 14 sends to the chip 12 a message 24, as request response, that includes the concerned LOCI.

As will be further explained in relation with the FIGS. 3A to 3C, the chip 12 detects, based on the LOCI, a currently available communication technology relating to the second network 110.

For instance, the currently available communication technology that is detected, based on the LOCI, by the chip 12 is of the 4G type.

Once the currently available communication technology is detected, the chip 12 compares the 4G to one or several preferred communication technologies of the stored correspondence table, as an ordered priority list.

As soon as the currently available communication technology matches a preferred communication technology of the ordered priority list, then the chip 12 switches to a second subscription that is associated with the corresponding preferred communication technology and that is related to the second operator MNO2.

In the described example, 4G, as the detected available communication technology, is associated, within the ordered priority list, with the subscription data set IMSI2, as the second subscription to be activated.

The chip 12 de-actives the first subscription data set IMSI1 and activates the second subscription data set IMSI2, so as to switch to the second subscription.

Once the second subscription data set IMSI2 is activated, the chip 12 sends to the phone 14 a REFRESH-INIT type proactive command 26, as a request for reading an EF-IMSI2, as a file relating to the concerned second subscription IMSI2.

Such a file reading request allows synchronizing the phone 14 with the chip 12 with respect to the subscription data set that is currently active, namely the second subscription data set IMSI2 instead of the previously first subscription data set IMSI1.

Alternatively, instead of a file reading request, the chip 12 sends to the phone 14 a REFRESH-RESET type proactive command, as a request for re-initializing or re-booting the phone 14.

Such a proactive command 26 allows reading all the files stored within the chip memory 124, and thus carrying out an internal subscription switch.

Optionally, the subscription manager requests a phone user to authenticate.

When applicable, after a successful user authentication, the phone 14 sends to the chip 12 a request 28 for getting an identifier(s) relating to a currently active subscription.

The chip 12 sends to the phone 14 a message 210, as a request response, including an identifier(s) IMSI2 relating to the second subscription, as the currently active subscription.

Alternately, without any phone request, the chip 12 sends to the phone 14 an identifier(s) IMSI2 relating to the second subscription, as a currently active subscription.

Once the second subscription identifier IMSI2 is received, the phone 14 updates its memory (like a cache memory), at least in a temporary manner, while copying or duplicating the second subscription data set IMSI2.

The phone 14 stores data relating to the second subscription data set IMSI2 that constitutes a copy of the data relating to the subscription which the chip 12 has just switched to.

Such a configuration of the phone 14 allows accessing, after a subscription switch within the chip 12, a set of data relating to the second subscription IMSI2 to be also active at the phone 14 side.

The chip 12 authenticates successfully, through the phone 14, to the second network 110 by using a network authentication key Ki1 (or Ki2) relating to the second subscription IMSI2, as a currently active subscription. To authenticate to the second network 110, the chip 12 exchanges with the second server 114 data 212. The exchanged data 212 may comprise e.g. a random originating through or from the second server 114, as a challenge, a corresponding challenge response and a network authentication success or failure.

FIG. 3A shows different data fields that are comprised within LOCI 30 that is provided by the phone 14 to the chip 12.

The LOCI 30 is compliant with the Tag Length Value (or TLV) that is defined in the specifications 3GPP TS 31.111 v12.3.0.

The LOCI 30 TLV defines a Mobile Country Code (or MCC), as a first data field 32, in combination with a Mobile Network Code (or MNC), as a second data field 34, that are coded on 2 bytes. The MCC-MNC allow determining the concerned country and network.

The LOCI 30 TLV also defines a Cell Identity Value (or Cell ID), as a third data field 36, that is coded on 2 bytes. The Cell ID is mandatory and is coded in compliance with 3GPP TS 24.008.

The LOCI 30 TLV also defines an Extended Cell Identity Value (or Extended Cell ID), as a fourth data field 38, that is coded on 2 bytes. The Extended Cell ID 38 is not available in a 2G type communication technology.

If the Extended Cell ID 38 is not present, then the chip 12 detects a 2G type communication technology, as being an available communication technology.

FIG. 3B shows the Extended Cell ID 38 relating to the LOCI 30, when the detected available communication technology is of the 3G type.

The Extended Cell ID 38 is coded in compliance with 3GPP TS 25.401 and 3GPP TS 25.413. The Extended Cell ID 38 includes a first byte 382 and a second byte 384.

If the Extended Cell ID 38 is present and its value, as predetermined first value, is, for its four most significant bits 386, zero and, for the other twelve less significant bits, undefined denoted X, then the chip 12 detects a 3G type communication technology, as being an available communication technology.

FIG. 3C shows the Extended Cell ID 38 relating to the LOCI 30, when the detected available communication technology is of the 4G type.

The Extended Cell ID 38 is coded in compliance with 3GPP TS 36.401. The Extended Cell ID 38 includes the first byte 382 and the second byte 384.

If the Extended Cell ID 38 is present and its value, as predetermined second value, is, for its four least significant bits 388, one and, for the other twelve most significant bits, undefined denoted X, then the chip 12 detects a 4G type communication technology, as being an available communication technology.

Alternately or additionally, a presence of another data field(s) of the LOCI or another information item provided to the chip 12 and/or a particular value of the LOCI or another information item provided to the chip 12 may be identified by the chip 12, so as to detect a presence of a currently available communication technology, like e.g. a 5G.

The invention solution allows changing, after a subscription switch at the chip 12 and the phone 14, the active subscription depending on, besides the country, an available communication technology.

The invention solution thus adds a granularity relating to the available communication technology and allows being flexible.

The invention solution does not need to involve a phone user, except for submitting user authentication data, when applicable.

The invention solution is therefore transparent to the user, apart from a possible user authentication operation.

The invention solution is compatible with the existing network infrastructure.

The invention solution is preferably secure by authenticating the terminal equipment to the second network and possibly a terminal user.

The invention claimed is:

1. A method for switching from a first to a second mobile network operator, wherein
   a device includes a chip, the chip storing a first subscription relating to the first mobile network operator, the first subscription being related to a home country, the chip storing at least one second subscription relating, each, to a second mobile network operator, each of the at least one second subscription being related to the home country or a foreign country, each of the at least one second subscription being associated with a preferred communication technology, the method comprises the following steps:
   the chip receives from the device location information;
   the chip analyses whether an extended cell identity value is or is not present within the location information;
   the chip detects, based upon the analysis, a currently available communication technology relating to a second mobile network, the second mobile network being related to a second home country operator or a foreign country operator;
   the chip compares the currently available communication technology to at least one preferred communication technology;
   if the currently available communication technology matches at least one preferred communication technology, then
   the chip switches to a second subscription associated with the preferred communication technology and relating to a corresponding second mobile network operator; and
   the chip sends to the device at least one identifier relating to the second subscription, the second subscription being related to the second mobile network.

2. Method according to claim 1, wherein the method further includes a step in which the chip authenticates successfully to the second mobile network by using a network authentication key relating to the second subscription.

3. Method according to claim 1, wherein, prior to detecting a currently available communication technology, the chip sends to the device a request for getting location information relating to a location where the device is currently situated.

4. Method according to claim 3, wherein, to detect a currently available communication technology, the method further comprises the following steps:
the location information including a value relating to an identity of a cell relating to the second mobile network;
if an extended cell identity value is not present, then the currently available communication technology is a 2G type communication technology.

5. Method according to claim 3, wherein, to detect a currently available communication technology, the method further comprises the following steps:
the location information including an extended cell identity value;
the chip compares the extended cell identity value to a predetermined first value relating to a 3G type communication technology;
if the extended cell identity value matches the predetermined first value relating to a 3G type communication technology, then the currently available communication technology is a 3G type communication technology.

6. Method according to claim 3, wherein, to detect a currently available communication technology, the method further comprises the following steps:
the location information including an extended cell identity value;
the chip compares the extended cell identity value to a predetermined second value relating to a 4G type communication technology;
if the extended cell identity value matches the predetermined second value relating to a 4G type communication technology, then the currently available communication technology is a 4G type communication technology.

7. Method according to claim 1, wherein the chip sends to the device a request for reading a file relating to the second subscription.

8. Method according to claim 1, wherein the chip sends to the device a request for re-initializing the device.

9. A device for switching from a first to a second mobile network operator, wherein
the device comprising a chip, the chip comprising means for storing a first subscription relating to the first mobile network operator, the first subscription being related to a home country, the chip comprising means for storing at least one second subscription relating, each, to a second mobile network operator, each of the at least one second subscription being related to the home country or a foreign country, the chip being able to receive from the device location information, each of the at least one second subscription being associated with a preferred communication technology, the chip is configured to:
analyse whether an extended cell identity value is or is not present within the location information;
detect, based upon the analysis, a currently available communication technology relating to a second mobile network, the second mobile network being related to a second home country operator or a foreign country operator;
compare the currently available communication technology to at least one preferred communication technology;
switch to a second subscription associated with the preferred communication technology, only if the currently available communication technology matches at least one preferred communication technology; and
send to the device at least one identifier relating to the second subscription, only if the currently available communication technology matches at least one preferred communication technology, the second subscription being related to the second mobile network.

10. Device according to claim 9, wherein the chip is removable from the device.

* * * * *